F. J. GAGNON, DEC'D.
G. McINTOSH, EXECUTRIX.
VALVE.
APPLICATION FILED NOV. 22, 1915.

1,239,898.

Patented Sept. 11, 1917.

Inventor
Frederick J. Gagnon

By Whittemore Hulbert & Whittemore
Attorneys

UNITED STATES PATENT OFFICE.

FREDERICK J. GAGNON, OF DETROIT, MICHIGAN; GRACE McINTOSH EXECUTRIX OF SAID FREDERICK J. GAGNON, DECEASED.

VALVE.

1,239,898.     Specification of Letters Patent.     Patented Sept. 11, 1917.

Application filed November 22, 1915. Serial No. 62,736.

*To all whom it may concern:*

Be it known that I, FREDERICK J. GAGNON, a citizen of the United States of America, residing at Detroit, in the county of Wayne and State of Michigan, have invented certain new and useful Improvements in Valves, of which the following is a specification, reference being had therein to the accompanying drawings.

The invention relates to valves particularly designed for use in the handling of gasolene and similar fluids, and the invention comprises the novel construction as hereinafter set forth.

Figure 1:
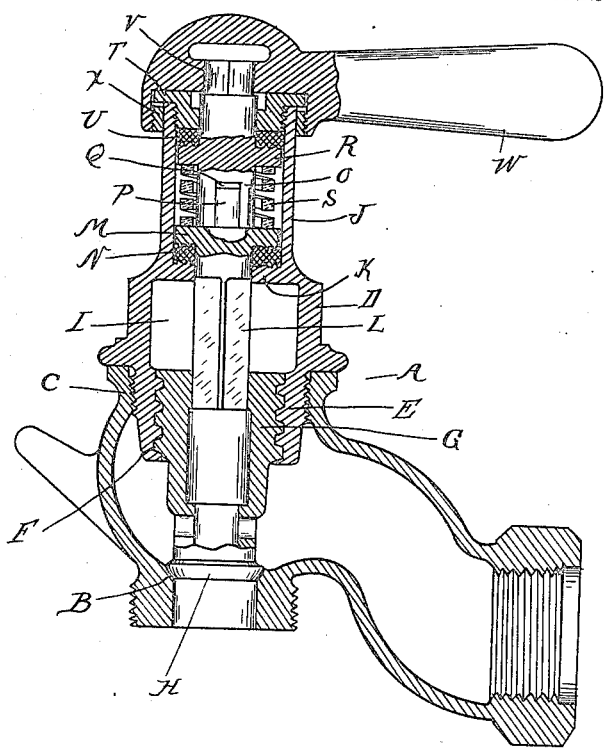
Figure 1 is a central longitudinal section through the valve.
Figure 2:
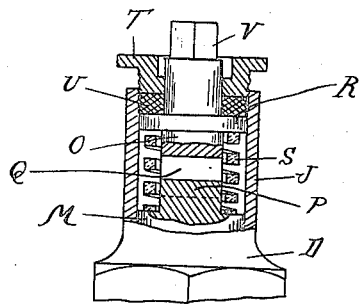
Fig. 2 is a cross section through a portion of the valve showing the manner of assembling the parts.

A is the valve casing provided with a valve-seat B therein and an enlarged threaded nipple C opposite said seat. D is a cap member having a threaded portion E for engaging the nipple C, said portion being internally threaded at F for engagement with a threaded hollow shank G of a valve member H for engaging the seat B. I is a recess or chamber in the member D adjacent to the threaded portion E, into which the member G is adjusted when the valve is withdrawn from its seat. J is an extension of the member D beyond the chamber I, and K is an apertured partition between the chamber I and the portion J forming a shoulder or seat for the valve-stem packing.

The valve stem comprises a square or polygonal portion L which engages a similarly shaped aperture in the shank member G, so as to be freely longitudinally adjustable thereon but rotatively coupled thereto. At the upper end of the stem L is a head M fitting within the portion J and having a flat under face opposite the shoulder K for bearing upon a packing N therebetween. O is an extension stem, which is separate from the stem L but is coupled thereto for rotative movement with provision for independent longitudinal movement. As shown the stem L has a flat key member P projecting therefrom and engaging a slot Q in the member O. R is an enlargement or collar on the stem O, fitting within the portion J and forming a shoulder or abutment for a spring S sleeved upon the stem O, the opposite end of said spring bearing against the head M. T is an annular cap member having a threaded engagement with the upper end of the portion J and forming a bearing for the stem O and a shoulder or abutment for a packing U arranged between the same and the collar R. The upper end of the stem O has a square or polygonal portion V for engaging a similarly-shaped aperture in a handle member W, said handle member being recessed to fit over the cap T and portion J of the cap D. The cap T is of slightly greater external diameter than the portion J so as to form on its under side an annular shoulder and an annular collar X having a threaded engagement with the wall of the recess in the handle, engages with this shoulder and prevents the handle from displacement.

With the construction as described, to assemble the parts the member G may be threaded into the member E and the stem L inserted through the upper end of the cap D, the packing N being first sleeved thereon so as to be between the head M and the shoulder K. The spring S is then sleeved upon the stem O and the latter inserted within the portion J and with its slot Q engaging the key portion P. The packing U is then placed on the stem O above the enlargement R and the annular cap T is then inserted and engaged with the threaded portion J. By tightening this annular cap member the spring S will be compressed so as to exert a tension oppositely upon the head M of the stem L and the enlargement R of the stem O, thereby forcing both of these members against their respective packing. The handle W may then be engaged with the squared end V of the stem O and the annular nut X secured to hold said member from displacement, this completing the assembly of the structure.

In use, the valve may be opened or closed by the rotation of the handle W, but it will be observed that this handle does not exert any longitudinal stress on either the stem O or the stem L. Both of these stem members are freely floating, and while capable of transmitting the rotary movement of the stem to the shank G of the valve, are longitudinally free from each other and from the members W and G. Thus the spring S which constantly exerts a tension against the head M and enlargement R will maintain these members in tight contact with the packings N and U, so as to avoid any leakage of the fluid around the stem.

By making the spring S of suitable tension the pressure exerted thereby will be in excess of the maximum pressure upon the fluid within the valve casing so that the head M is maintained against the packing. If, however, through any cause the pressure within the valve casing should rise beyond this point and liquid should thereby be forced past the head M, it nevertheless could not escape, for the increased pressure would only tighten the contact of the enlargement R against the packing U.

It is desirable to keep the spring normally out of contact with the gasolene, as the impurities sometimes present in this fluid have a corrosive action upon the metal. This I have accomplished with my improved construction by placing said spring in the chamber separated from the oil by the packing N, and only on rare occasions is there any oil in this chamber.

What I claim as my invention is:—

1. In a valve, the combination with a casing having a valve seat therein, of a valve having a threaded engagement with said casing for adjustment longitudinally with respect to its seat, a stem insertible through the outer end of said casing into rotative coupling engagement with said valve member, a collar on said stem, an annular shoulder within said casing surrounding said stem adjacent to said collar, packing between said collar and shoulder, a second stem rotatively coupled but longitudinally free from said first stem within said casing, a collar on said second stem, a spring sleeved on said stem between the collar thereon and the collar on said first stem, an annular cap surrounding said second stem engaging said casing and forming an abutment for compressing said spring, a packing between said abutment and the collar on said second stem, and a handle rotatively secured on said casing recessed for engagement with the outer end of said second stem and forming a rotative coupling engagement therewith.

2. In a valve, the combination, with a casing having a valve seat therein, of a valve member having a threaded engagement with said casing for longitudinal adjustment with respect to its seat upon rotation thereof, a stem having a non-rotative longitudinally slidable engagement with said valve, a handle rotatively engaging the casing, a member detachably engaging the casing, apertured for the stem, said member being received within a recess of the handle and retaining the handle in engagement with the casing, packing seated on said member, a collar carried by the stem and a spring bearing upon said collar pressing the same upon said packing.

In testimony whereof I affix my signature in presence of two witnesses.

FREDERICK J. GAGNON.

Witnesses:
    JAMES P. BARRY,
    PHYLLIS COBURN.